United States Patent Office 3,255,040
Patented June 7, 1966

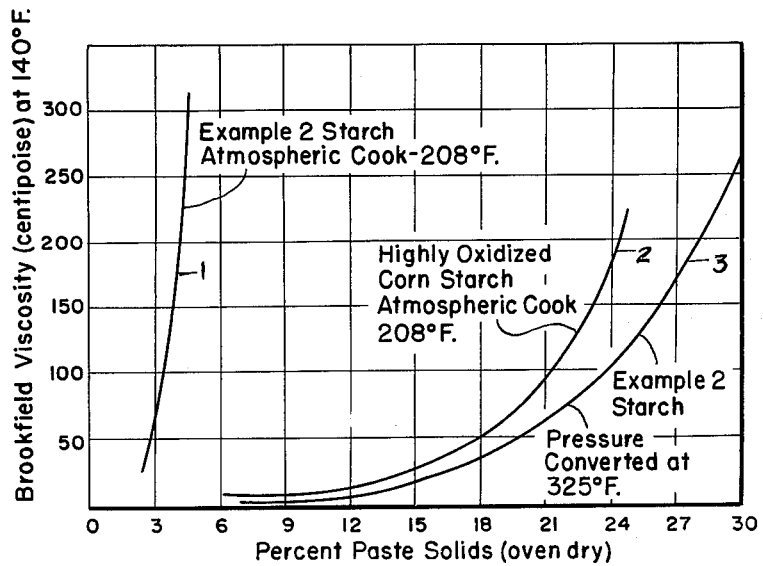
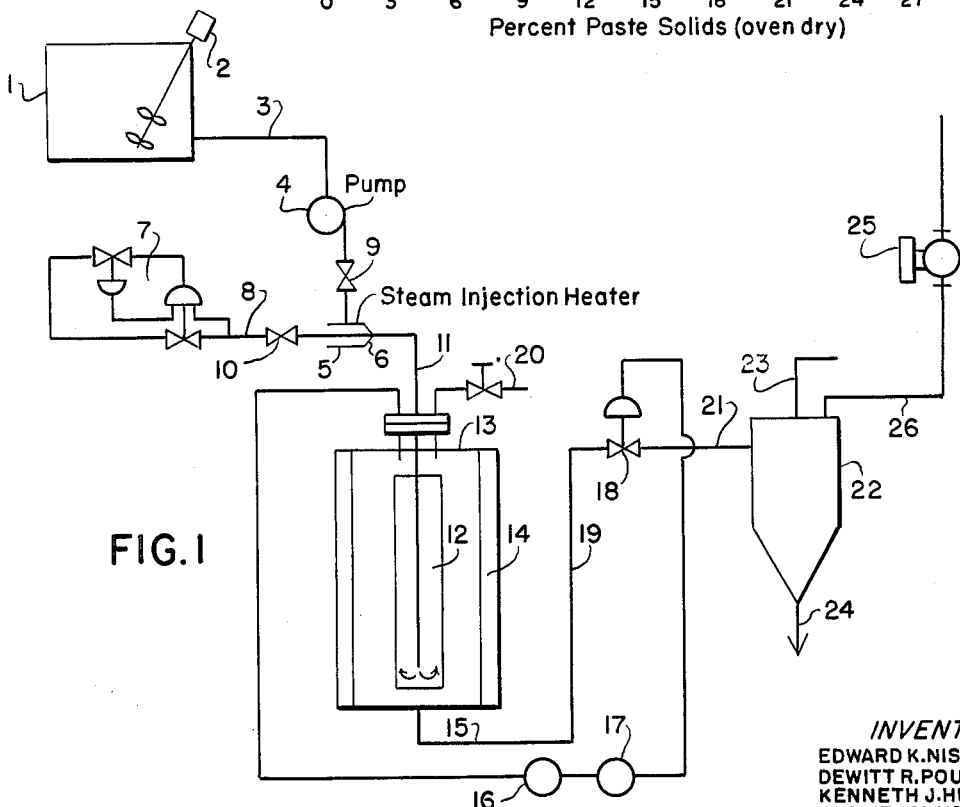
INVENTORS.
EDWARD K. NISSEN
DEWITT R. POURIE
KENNETH J. HUBER
JACK F. JOHNSTON
ATTORNEYS.

3,255,040
PROCESS OF MAKING COATING COLOR STARCH PASTES AND STARCH PASTES SO PRODUCED
Kenneth J. Huber and Jack F. Johnston, Granite City, Ill., and Edward K. Nissen and De Witt R. Pourie, St. Louis, Mo., assignors to Union Starch & Refining Co., Inc., Columbus, Ind., a corporation of Indiana
Filed Jan. 13, 1964, Ser. No. 337,476
4 Claims. (Cl. 127—32)

This application is a continuation-in-part of copending application Serial No. 290,099 filed on June 24, 1963.

This invention relates to a process of making a low viscosity starch paste especially useful as a size press starch or for a binder in paper coating colors.

Among the objects of the invention is to provide a low viscosity starch paste for paper coating having filming characteristics at least equal to those of ethylated starch.

Among other objects of the invention is to provide a process of making a low viscosity starch paste from a starch which has been modified only by the minimum chemical treatment.

The objects of the invention are attained by very gently oxidizing starch and thereafter cooking the slightly oxidized starch at high temperatures and pressures.

The starch, in the form of a slurry, is oxidized by 1 to 2% available chlorine based on the starch content. The starch slurry which is oxidized is preferably alkaline at a pH of 7.5 to 10.5, and at about 19–23° Bé. During the treatment the slurry is maintained at a temperature of about 80–110° F. and the treatment is continued under such conditions for 1 to 3 hours, whereupon the reaction is halted by adding sodium bisulphite to neutralize the mix.

Sodium or calcium hypochlorite are suitable agents for oxidizing the starch although other oxidants may also be employed.

One phase of this invention is based in the discovery that starch oxidized with 1–2% of available chlorine rather than the conventional amount of 2.3–5.5% undergoes a rapid decrease in viscosity when cooked at high temperatures and pressures so as to produce a paste having lower viscosity than that obtained with said higher oxidized starches. Another phase of the invention is based on the discovery that said low viscosity pastes made from slightly oxidized starches having filming characteristics useful in the coating of paper which are at least equal to those of the more expensive starch ethers such as ethylated starch.

The slightly oxidized starches of the present invention are cooked in the apparatus as described below and under the conditions set forth in the table below.

In the drawing:

FIG. 1 shows, in the form of a flow diagram, an apparatus which is useful for the cooking of oxidized starch according to the present invention.

FIG. 2 is a graph of "Brookfield" viscosity v. concentration of starch pastes.

The slurry is formed in tank 1 which is provided with an agitator 2. The slurry connects through line 3 to a positive displacement pump 4 which feeds the slurry through valve 9 to the steam injector heater 5. Steam is fed through a pressure regulating and adjusting valve means 7 to line 8, valve 10 to the injector heater 5. The injection heater is shown diagrammatically, such devices being known in the art. The granules of starch in the slurry are instantly heated in injector 5 and discharged through orifice 6 into line 11 under pressure. The end of line 11 extends into the pressure cooking vessel 13 down to within a short distance of the bottom of baffle chamber 12. The vessel 13 is closed to the atmosphere and has a heat jacket and/or insulating covering 14. Paste introduced into the bottom of the baffle chamber 12, overflows said chamber and moves toward the bottom of vessel 13 and into line 15 without producing channelling. The small needle valve 20 on the top of the tank is used only to vent off non-condensible gases and does not effectively lower the pressure inside the vessel 13. The level of paste in vessel 13 is regulated by the automatic level transmitter which senses the pressure differential between the vapor at the top of vessel 13 and the hydraulic pressure in line 15, and through controller 17, automatically adjusts the opening of valve 18 to control the flow of paste through line 19.

The paste from valve 18 flashes to atmospheric pressure through line 21 to a centrifugal separator 22. Steam and other vapors are removed through vent 23 while the final product flows through line 24. Water can be metered into the separator 22 through line 26 with the aid of a metering pump 25.

The following table summarizes the condition of operation of the process.

|  | Optimum | Maximum | Minimum |
|---|---|---|---|
| Through-put rate (gallons per minute) | 5 | 10 | 1 |
| Steam pressure (p.s.i.g) | 100 | 140 | 60 |
| Tank level | (¹) | (¹) | (²) |
| Retention time with full tank (min.) | 8 | 4 | 40 |
| Discharge temperature (° F.) | 320 | 350 | 250 |
| Paste concentration ³ (lb./gal.) | ½ to 3 | | |

¹ Full.
² Empty.
³ Dependent on the type of starch.

The following examples illustrate how applicants' process is carried out and by means of comparison tests illustrates some of the unexpected features of the invention. In these examples corn starch is employed as the starting material but starches from other sources may be substituted for all or a part of the corn starch.

EXAMPLE 1

250 lbs. of pearl starch were slurried at 60° F. to provide a 21Bé. slurry. The pH was adjusted to 8.5 and the slurry was heated to 100° F. Over a period of approximately two hours an NaOCL solution was gradually added in sufficient amounts to provide about 1.5% of available chlorine based on the starch content. After the final addition, the slurry was maintained for another two hours at 95–100° F. and then neutralized with sodium bisulphite. Finally the pH was adjusted to 6.8 by dilute HCl. The product was washed by dilution to 15° Bé. and dewatered on an Eimco filter. The resultant wet starch can be dried for later use or can be reslurried immediately to provide a slurry containing about 2–3 lbs./gal. dry substance (D.S.) starch.

The product of Example 1 cooked under normal atmospheric conditions has viscosity characteristics slightly lower than those of unmodified pearl starch.

Viscosity tests measured by a Brookfield viscometer are as follows:

| Solids, percent | Viscosity, cps. | |
|---|---|---|
| | Example 1 | Pearl |
| 3.0 | 60 | 100 |
| 4.0 | 150 | 450 |

Utilizing cooking conditions more severe than atmospheric conditions (i.e. pressures in excess of 30 p.s.i.g. temperatures above 230° F.) one would expect a reduction in the described "normal" viscosity of one-half to two-thirds. The results when using this product, however, far exceeded expected drop. The final paste, in fact, was lower in viscosity than the highly oxidized starches conventionally manufactured.

Actual viscosity data is as follows:

| Solids, percent: | Viscosity, cps., Brookfield | |
|---|---|---|
| | Example 1, Pressure converted 325° F. | Starch Oxidized with about 6% of available Cl, Standard cook 207° F. |
| 30 | 268 | 425 |
| 25 | 134 | 230 |
| 20 | 49 | 75 |

Pressure conversion of the highly oxidized starches was unsuccessful in that high paste colors developed and precipitates formed.

This modified product of Example 1 has been specifically produced for pressure conversion utilizing minimum chemical treatment while obtaining maximum viscosity reduction in the converter.

There was unexpectedly obtained improved filming characteristics in addition to the large viscosity reductions.

The superior filming characteristics were evidenced by visual inspection and the comparison of coated papers using pressure converted starch as an adhesive and chemically modified starch (starch ether formed by ethylation).

In coating colors, the filming characteristics of a starch may be described by its ability to resist penetration of the adhesive into the porous paper substrate. Ideally, a perfect film former would not penetrate the sheet at all, but would remain on the surface as a continuous top layer.

This condition would be analogous to placing the coating on glass where no penetration could occur.

Using this analogy, the filming or water holding power of a coating color may be estimated by coating glass and paper with equal amounts of color and comparing the areas covered. This is the principle involved in the Inclined Plane Test.

For the Inclined Plane Test, a measured quantity of coating is placed on an inclined plate glass bed. A polished stainless steel roll is then allowed to roll over the coating, leaving an oval smear on the plane surface. The length and maximum width of the smear is measured and the relative areas (A) calculated. This procedure is repeated a second time only with the roll covered with a paper base stock. The relative area (B) of the second smear is calculated. The ratio (R) of $A/B$ indicates the relative filming qualities.

In an ideal case, R would equal 1.0. From practical experience, ratios of 1.4 to 1.5 are considered good, 1.5 to 1.6 fair and above this are poor with respect to "water holding" power.

Following are the results of tests using ethylated and pressure converted starch:

| Starch | Ethylated [1] | Example 1, Pressure Converted |
|---|---|---|
| Coating Viscosity, cps | 104 | 141 |
| Solids, percent | 54 | 54 |
| Area, A | 30.4 | 36.1 |
| Area, B | 21.1 | 24.8 |
| Ratio, R | 1.44 | 1.45 |

[1] Commercially available ethylated starch recommended for paper coating was used in this test.

The following example illustrates how the pressure conversion of the starch paste for Example 1 is carried out.

EXAMPLE 2

A slurry containing 2–3 lb./gal. of D.S. starch was passed at a speed of 5 gallons per minute through the injection heater 5 of the drawing, operated at a steam pressure of about 100 p.s.i.g. The tank 13 of about 50 gal. capacity was heated to 325° F. and was maintained substantially half full at a pressure of 100 p.s.i.g. Dilution water at 95° F. was added at 26 in accordance with the table below:

| Dilution Water (g./m.[1]) | Percent Dry Substance (Oven Method) | Viscosity (cps.) [2] |
|---|---|---|
| 0 | 32 | 100 |
| 1.25 | 22 | 45 |
| 3.3 | 19 | 25 |
| 5.0 | 16 | 16 |
| 11.0 | 10 | 10 |

[1] g./m.=gallons per minute.
[2] Brookfield Viscometer, #1 spindle at 20 r.p.m., samples read at 155° F.

The viscosity vs. solid-content graphs of FIG. 2 illustrate the unexpected feature of the application, namely that the high pressure conversion of the slightly oxidized starch of Example 2 (curve 3) reduces the viscosity thereof much more than would be expected from data obtained by atmospheric cooking thereof (curve 1) or from the high pressure cooking of highly oxidized starch (curve 2). Viscosities of starch pastes made from starches oxidized with somewhat less than 6% chlorine have been tested and the curves for these pastes lie between curves 1 and 2.

The features and principles underlying the invention described above in connection with specific exemplifications will suggest to those skilled in the art many other modifications thereof. It is accordingly desired that the appended claims shall not be limited to any specific feature or details thereof.

We claim:

1. Process for making starch paste comprising the steps of
   slightly oxidizing a substantially unmodified starch to a degree equivalent to that obtained by oxidizing with about 1 to 2% of chlorine, based on the dry substance starch,
   pressure converting the slightly oxidized starch by continuously feeding a slurry of the same in the form of a stream to a steam injection heating device,
   instantly heating said starch at a gauge pressure of about 60–240 pounds per square inch,
   continuously passing the stream of heated starch paste to a pressure converting zone maintained at a temperature of between 250° F. and 350° F.,
   and feeding the converted starch paste into a vessel at atmospheric pressure.

2. The process as claimed in claim 1 wherein the unmodified starch is oxidized by forming a slurry at a pH of 7.5 to 10.5, heated to 80–110° F., treated with 1–2% of chlorine, based on the dry substance starch, for about 1–3 hours and then neutralized.

3. The process as claimed in claim 2 wherein the chlorine is added as sodium hypochlorite.

4. A starch paste having a relatively low viscosity and superior filming characteristics obtained by the pressure conversion at 250 to 350° F. of a slightly oxidized starch equivalent to that obtained by oxidizing said starch with about 1–2% of chlorine, based on the dry substance starch, acting on a starch slurry at a pH of 7.5 to 10.5 at a temperature of 80 to 140° F. F. for a period of about 1 to 3 hours.

References Cited by the Examiner

UNITED STATES PATENTS 2,448,510  9/1948  Barham _____ 260—233.3

MORRIS O. WOLK, *Primary Examiner.*

UNITED STATES PATENT OFFICE
CERTIFICATE OF CORRECTION

Patent No. 3,255,040            June 7, 1966

Kenneth J. Huber et al.

It is hereby certified that error appears in the above numbered patent requiring correction and that the said Letters Patent should read as corrected below.

Column 4, line 48, for "60-240" read -- 60-140 --.

Signed and sealed this 3rd day of June 1969.

(SEAL)
Attest:

Edward M. Fletcher, Jr.

Attesting Officer

Commissioner of Patents